(12) United States Patent
Dalbehera et al.

(10) Patent No.: US 9,264,410 B2
(45) Date of Patent: Feb. 16, 2016

(54) DYNAMIC CONFIGURATION OF TRUSTED EXECUTED ENVIRONMENT RESOURCES

(71) Applicant: Sony Corporation, Tokyo (JP)

(72) Inventors: Pravat Dalbehera, Lund (SE); Stefan Andersson, Klagerup (SE); Rimpu Varshney, Lund (SE); Petter Wallin, Lund (SE)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/296,885

(22) Filed: Jun. 5, 2014

(65) Prior Publication Data

US 2015/0358301 A1 Dec. 10, 2015

(51) Int. Cl.
*H04L 9/00* (2006.01)
*H04L 29/06* (2006.01)
(52) U.S. Cl.
CPC .......... *H04L 63/061* (2013.01); *H04L 63/0428* (2013.01)
(58) Field of Classification Search
CPC ....... H04L 9/08; H04L 63/061; H04L 9/0844; H04L 63/0428; H04W 12/04
USPC .......................................................... 713/171
See application file for complete search history.

(56) References Cited

U.S. PATENT DOCUMENTS

| 8,984,592 B1 * | 3/2015 | Paczkowski et al. ............. 726/4 |
| 2014/0004825 A1 | 1/2014 | Prakash et al. |
| 2014/0143534 A1 | 5/2014 | Chastain et al. |

FOREIGN PATENT DOCUMENTS

WO    WO 2014/040724 A1    3/2014

OTHER PUBLICATIONS

Notification of Transmittal of the International Search Report and the Written Opinion of the International Searching Authority, or the Declaration, PCT/JP2014/005948, Feb. 25, 2015.

* cited by examiner

*Primary Examiner* — Baotran N To
(74) *Attorney, Agent, or Firm* — Myers Bigel Sibley & Sajovec, P.A.

(57) ABSTRACT

Systems and methods for dynamic trusted execution environment (TEE) hardware configuration are provided. A key update message including key update information is received and authenticated for a key stored in the TEE of a mobile computing device. The stored key may define access to hardware resources of the mobile computing device. The hardware configuration for the stored key in the TEE may be changed based upon the key update information.

20 Claims, 6 Drawing Sheets

OTA Message 510

US 9,264,410 B2

DYNAMIC CONFIGURATION OF TRUSTED EXECUTED ENVIRONMENT RESOURCES

FIELD

Embodiments of the present invention relate to security of electronic devices and application services.

BACKGROUND

The Trusted Execution Environment (TEE) is a secure portion of a processor of a mobile device that ensures that sensitive data is processed in a protected and trusted environment. The TEE may offer safe execution of trusted applications and end-to-end security of access to data, software and hardware resources. The TEE is part of the security framework of a mobile device. FIG. 1 shows a security framework 100 with the Rich Operating System (Rich OS) or Rich Execution Environment (REE) 102, the TEE 104 and the Secure Element (SE) 106. The Rich OS 102 executes applications available from third parties. The SE 106 includes software and tamper resistant hardware for high levels of security for proximity payment applications, electronic signatures and PIN numbers.

The TEE 104 helps to control access rights and offers protection against software attacks that may originate from the Rich OS 102 environment. For example, the TEE 104 provides the environment for high-definition (HD) video providers to keep their premium content secure so that it cannot be duplicated or shared.

However, the configuration of hardware resources available for keys stored in the TEE 104 is static and hardcoded by the manufacturer. Any change to the TEE use of hardware resources for a key requires all the software of the TEE 104 to be flashed or overwritten. It is rather expensive to change the configuration of stored keys in order to add new use cases or modify old use cases for usage of the hardware resources.

SUMMARY

Various embodiments described herein provide for a redesign of key management to better handle TEE hardware configuration. According to some embodiments, a mobile computing device may include a processor and a memory coupled to the processor and comprising computer readable program code embodied in the memory that when executed by the processor causes the processor to perform operations. The operations may include receiving a key update message comprising key update information from another computing device and authenticating the key update message for a key stored in a trusted execution environment (TEE) of the mobile computing device. The stored key may define a configuration used by the processor to control access to hardware resources of the mobile computing device in or from the TEE. The key update information may identify a hardware resource of the mobile computing device that is authorized to be used by a trusted application in the TEE. The operations may further include changing the configuration for the stored key in the TEE based upon the key update information responsive to a positive authentication. Access to the hardware resources may be changed for the stored key.

According to some embodiments, the key update information may be first key update information and the hardware resource may be a first hardware resource authorized by the stored key to be used by the trusted application. The key update message may include second key update information corresponding to a second hardware resource of the mobile electronic device authorized by the stored key to be used by the trusted application different than the first hardware resource.

According to some embodiments, the key update information may include a key update flag, and the operations may include updating the configuration to grant or deny access to the hardware resource based on the key update flag.

According to some embodiments, the key update message may be an over-the-air (OTA) message received by the mobile computing device from the other computing device. The operations may further include controlling access to the hardware resource by the trusted application based on changes to the configuration responsive to the key update information.

According to some embodiments, the key update message may be an encrypted private key binary large object (key BLOB). The operations may further comprise decrypting the encrypted key BLOB using a private key of the stored key in the TEE and updating the configuration of the stored key defining access to the hardware resource for the trusted application in the TEE based on the key update information. The stored key may be stored using a key binary large object (key BLOB).

According to some embodiments, the operations may include updating the configuration only for the stored key. The stored key may be one of a plurality of stored keys in the TEE.

According to some embodiments, a method may include receiving, by a mobile computing device, a key update message comprising key update information from another computing device and authenticating the key update message for a key stored in a trusted execution environment (TEE) of the mobile computing device. The stored key may define a configuration used by the processor to control access to hardware resources of the mobile computing device in or from the TEE. The key update information may identify a hardware resource of the mobile computing device that is authorized to be used by a trusted application in the TEE. The method may further include changing the configuration for the stored key in the TEE based upon the key update information responsive to a positive authentication. Access to the hardware resources may be changed for the stored key.

According to some embodiments, the key update information may be first key update information and the hardware resource may be a first hardware resource authorized by the stored key to be used by the trusted application. The key update message may include second key update information corresponding to a second hardware resource of the mobile electronic device authorized by the stored key to be used by the trusted application different than the first hardware resource.

According to some embodiments, the key update information may include a key update flag, and the method may include updating the configuration to grant or deny access to the hardware resource based on the key update flag.

According to some embodiments, the key update message may be an over-the-air (OTA) message received by the mobile computing device from the other computing device. The method may further include controlling access to the hardware resource by the trusted application based on changes to the configuration responsive to the key update information.

According to some embodiments, the key update message may be an encrypted private key binary large object (key BLOB). The method may include decrypting the encrypted key BLOB using a private key of the stored key in the TEE and updating the configuration of the stored key defining access to the hardware resource for the trusted application in the TEE based on the key update information. The stored key may be stored using a key binary large object (key BLOB).

According to some embodiments, the configuration may be updated only for the stored key. The stored key may be one of a plurality of stored keys in the TEE.

According to some embodiments, a computing device may include a processor and a memory coupled to the processor and comprising computer readable program code embodied in the memory that when executed by the processor causes the processor to perform operations. The operations may include generating a key update message comprising key update information that corresponds to a key stored in a trusted execution environment (TEE) of a mobile computing device. The key update information may be used by the mobile computing device to reconfigure a TEE hardware configuration used by the processor to control access to hardware resources of the mobile computing device from the TEE. The operations may also include encrypting the key update message for the stored key and sending the key update message to the mobile computing device. The key update information may identify a hardware resource of the mobile computing device that is authorized to be used by a trusted application in the TEE.

According to some embodiments, the key update information may include a key update flag to cause the processor to update the configuration to grant or deny access to the hardware resource by the trusted application based on the key update flag.

According to some embodiments, the key update message is an over-the-air (OTA) message comprising an encrypted key binary large object (key BLOB) and the key update message is sent to the TEE and addressed only the stored key in the TEE, which is one stored key among a plurality of stored keys.

Other devices, methods, and/or computer program products according to embodiments of the invention will be or become apparent to one with skill in the art upon review of the following drawings and detailed description. It is intended that all such additional devices, methods, and/or computer program products be included within this description, be within the scope of the present invention, and be protected by the accompanying claims. Moreover, it is intended that all embodiments disclosed herein can be implemented separately or combined in any way and/or combination.

BRIEF DESCRIPTION OF THE DRAWINGS

The accompanying drawings, which are included to provide a further understanding of the invention and are incorporated in and constitute a part of this application, illustrate certain embodiment(s) of the invention.

DETAILED DESCRIPTION

Figure 1:
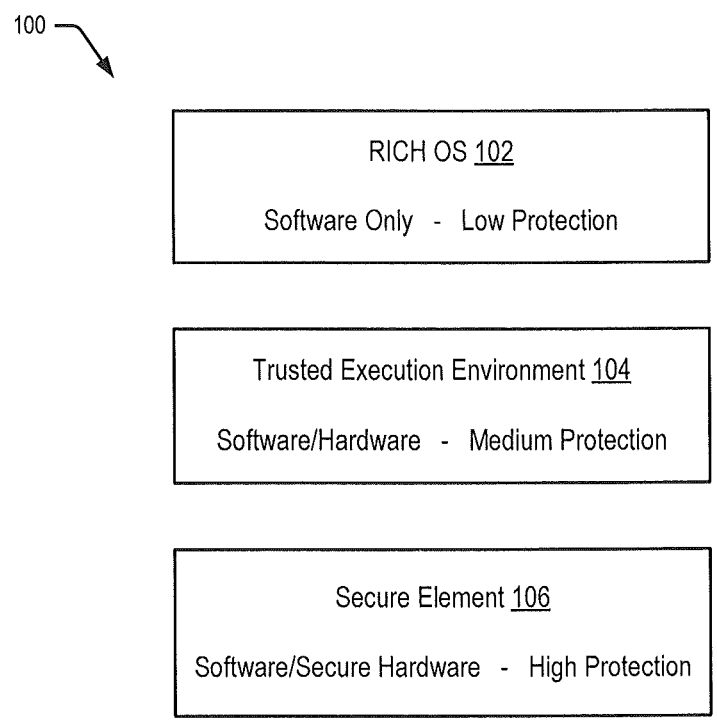
FIG. 1 illustrates a security framework of a mobile device.

The present invention now will be described more fully with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

As used herein, the term "comprising" or "comprises" is open-ended, and includes one or more stated features, integers, elements, steps, components or functions but does not preclude the presence or addition of one or more other features, integers, elements, steps, components, functions or groups thereof. As used herein, the term "and/or" includes any and all combinations of one or more of the associated listed items. Furthermore, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation.

The terminology used herein is for the purpose of describing particular embodiments only and is not intended to be limiting of the invention. As used herein, the singular forms "a", "an" and "the" are intended to include the plural forms as well, unless the context clearly indicates otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this disclosure and the relevant art and will not be interpreted in an idealized or overly formal sense unless expressly so defined herein.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Furthermore, "coupled" or "connected" as used herein may include wirelessly coupled or connected.

Embodiments described herein provide for a redesign of TEE key management to better handle hardware configuration changes for keys stored in the TEE. Such keys may use key binding. The TEE of the mobile device may be configured so that it can change the hardware configuration for a key stored in the TEE based on key update information received in a key update message. Such a message may include, for example, an over-the-air (OTA) message for signed configuration of TEE hardware. Key update information may include one or more key update flags that correspond to hardware resources made available in or by the TEE.

A key binary large object (key BLOB) may be installed on a mobile device to define hardware usage for a key stored in the TEE of the mobile device. A key BLOB may normally include an encrypted key, public data and a Hash-based Message Authentication Code (HMAC). The encrypted key may be a private key encrypted with a key only available in the TEE. Public data may include digital certificates. HMAC may be used for the entire (or almost the entire) key BLOB with a key only available in the TEE.

According to some embodiments, signed key BLOBs installed on the phone may be extended to be configurable for TEE hardware usage. A key BLOB may additionally include a TEE configuration defining how TEE hardware should be configured for the stored key. For example, HD content providers employ digital rights management (DRM) to protect their content from being freely distributed by a device. In such a case, the mobile device may include a private key that can only be accessed by a specific TEE application. This private key cannot be exported outside the TEE and data encrypted with the private key may be passed to a secure video output path in the TEE. This protects the video content from being poached from a video path in the device. However, if the content owner wishes to change the use of hardware resources for a given key, perhaps as a result of a contract change or a licensing deal, the content owner can change the hardware configuration for a key with a key update message to the TEE of the mobile device. This key update message may be an OTA message or may be included in an OTA message.

Figure 2:
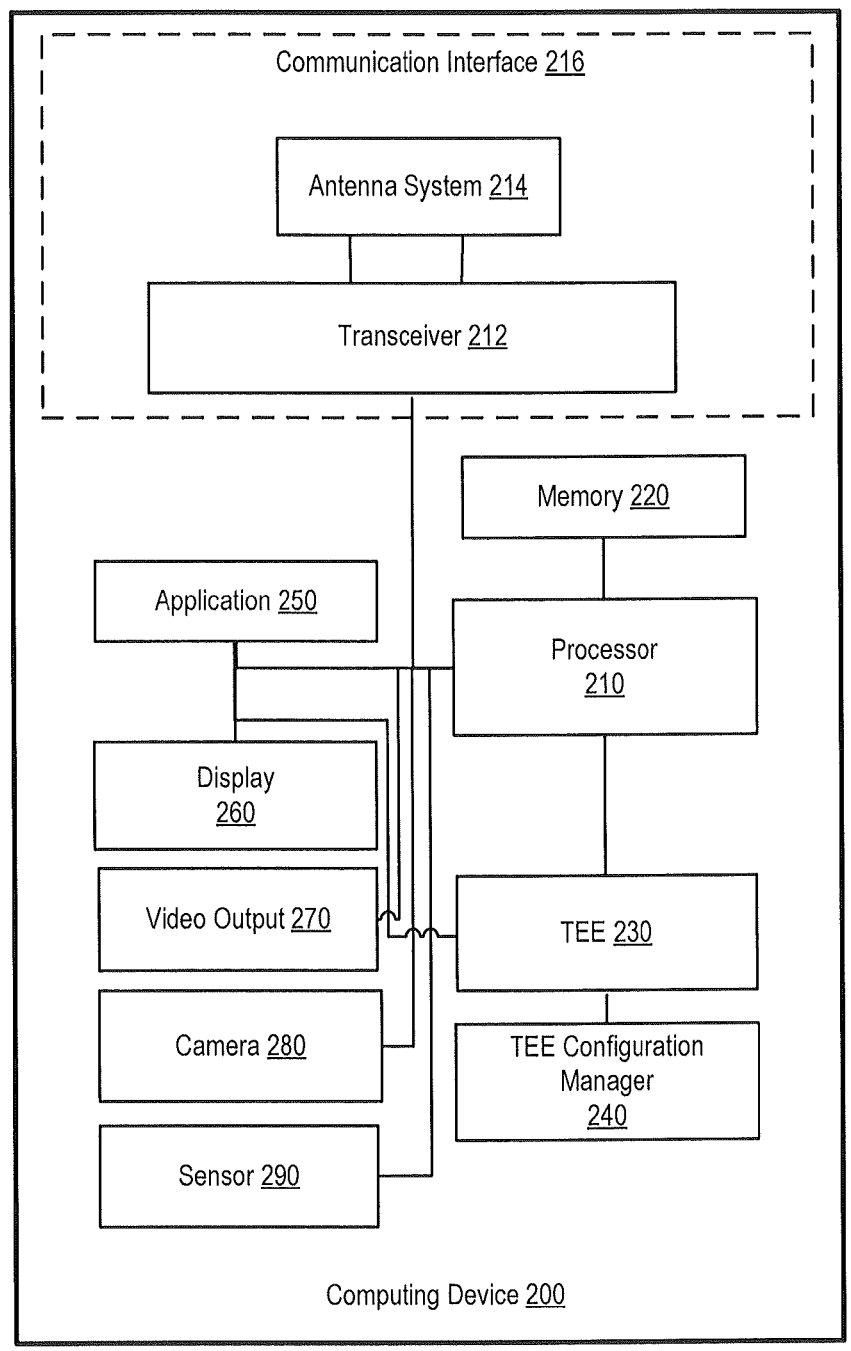
FIG. 2 is a schematic block diagram of a computing device, according to various embodiments.

According to some embodiments, the key update message may change the TEE hardware configuration of a stored key in the TEE of the mobile device because the TEE of the mobile device may now be configured to allow such secure changes. For example, FIG. 2 is a schematic block diagram of a computing device that includes software and/or hardware for management of TEE hardware configurations, according to various embodiments. Computing device 200 may be a mobile computing device or a mobile communication terminal but is not limited to such devices. Device 200 may communicate with a cellular network, wide area network, wireless local area network, the internet or other devices using a communication protocol. For example, the communication protocol may include IEEE 802.11a, 802.11b, 802.11g, 802.11n, 802.11ac, and/or other wireless local area network protocols.

In some embodiments, device 200 includes various components, such as a communication interface 216 for connecting to the internet or other devices through a wireline or wireless network. The communication interface 216 may also include an antenna system 214 and a cellular and/or Wi-Fi transceiver 212 (e.g., multi-band). Device 200 may include a processor 210, a memory 220 and multiple hardware resources, such as display 260, video output 270 (e.g., HDMI port), camera 280 and/or sensor 290. Some embodiments provide that the display 260 may include a touch sensitive display or screen, or the like.

The memory 220 stores software that may be executed by the processor 210, and may include one or more erasable programmable read-only memories (EPROM or Flash EPROM), battery backed random access memory (RAM), magnetic, optical, or other digital storage device, and may be separate from, or at least partially within, the processor 210. The processor 210 may include more than one processor, such as, for example, a general purpose processor and a digital signal processor, which may be enclosed in a common package or separate and apart from one another. In particular, the processor 210 may be configured to control various functions of the device 200, including receiving input from a touch sensitive screen or other sensors.

Device 200 may communicate with a base station of a network using radio frequency signals, which may be communicated through antenna system 214. For example, device 200 may be configured to communicate via the cellular transceiver 212 using one or more cellular communication protocols such as, for example, Advanced Mobile Phone Service (AMPS), ANSI-136, Global Standard for Mobile (GSM) communication, General Packet Radio Service (GPRS), enhanced data rates for GSM evolution (EDGE), code division multiple access (CDMA), wideband-CDMA, CDMA2000, and/or Universal Mobile Telecommunications System (UMTS), among others. Communication protocols as used herein may specify the information communicated, the timing, the frequency, the modulation, and/or the operations for setting-up and/or maintaining a communication connection. In some embodiments, the antenna system 346 may be a single antenna.

It is to be understood that the present invention is not limited to the particular configurations shown in FIG. 2, but is intended to encompass any configuration capable of carrying out operations described herein. While particular functionalities are shown in particular blocks by way of illustration, functionalities of different blocks and/or portions thereof may be combined, divided, and/or eliminated. Moreover, the functionality of the hardware/software architecture may be implemented as a single processor system or a multi-processor system in accordance with various embodiments of the present invention.

Embodiments of the present invention may include methods, electronic devices, and/or computer program products. Some embodiments of the present invention are described with reference to block diagrams and/or operational illustrations of methods and electronic devices. In this regard, each block may represent a module, segment, or portion of code, which comprises one or more executable instructions for implementing the specified logical function(s). It is to be understood that each block of the block diagrams and/or operational illustrations, and combinations of blocks in the block diagrams and/or operational illustrations can be embodied on analog circuitry and/or digital circuitry. These program instructions may be provided to a controller circuit, which may include one or more general purpose processors, special purpose processors, ASICs, and/or other programmable data processing apparatus, such that the instructions, which execute via the controller, create means for implementing the functions/acts specified in the block diagrams and/or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

These computer program instructions may also be stored in a computer-usable or computer-readable memory that may direct a controller circuit to function in a particular manner, such that the instructions stored in the computer usable or computer-readable memory produce an article of manufacture including instructions that implement the function specified in the flowchart and/or block diagram block or blocks. The computer-usable or computer-readable medium may be, for example but not limited to, an electronic, magnetic, optical, electromagnetic, or semiconductor system, apparatus, or device. More specific examples (a nonexhaustive list) of the computer-readable medium include the following: hard disk devices, optical storage devices, magnetic storage devices, random access memory (RAM) devices, read-only memory (ROM) devices, erasable programmable read-only memory (EPROM or Flash memory) devices, and compact disc read-only memory (CD-ROM).

FIG. 2 shows TEE 230, which may be part of the security framework of device 200. TEE 230 may be used for handling storage of sensitive data and execution of trusted applications. TEE 230 provides access of the data and hardware resources to trusted applications based on a TEE configuration stored and/or managed by TEE configuration manager 240. FIG. 2 is used for explanatory purposes and, in some embodiments, TEE Configuration Manager 240 may be located in TEE 230, TEE 230 and TEE Configuration Manager 240 may be located in processor 210 or another processor or chipset. TEE 230 may be separated by hardware from the operating system.

Figure 3:
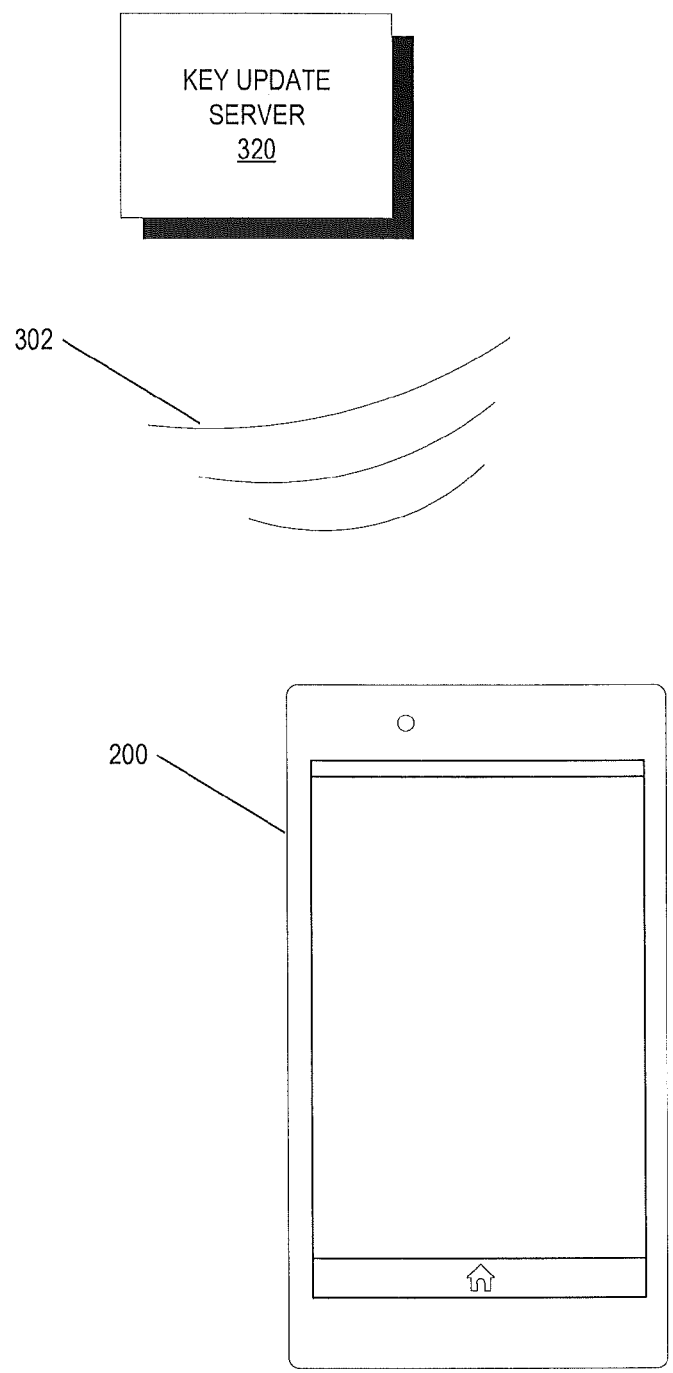
FIG. 3 illustrates updating a TEE hardware configuration, according to various embodiments.

TEE 230 may store keys that provide access to resources and may be used to authenticate operations of a trusted application or messages intended for the trusted application. Such messages may be received from a cloud server. For example, FIG. 3 shows a key update message, which is or is included in an over-the-air (OTA) message 302 from key update server 320 to mobile computing device 200.

Figure 4:
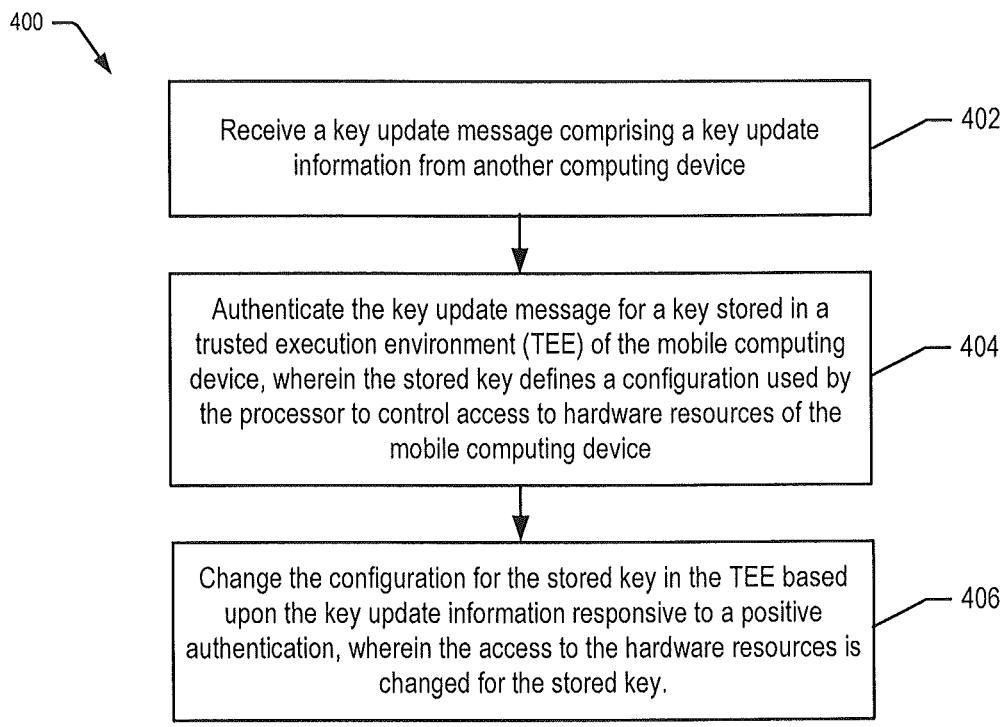
FIG. 4 is a flowchart illustrating a process for updating a TEE hardware configuration, according to various embodiments.
Figure 6:
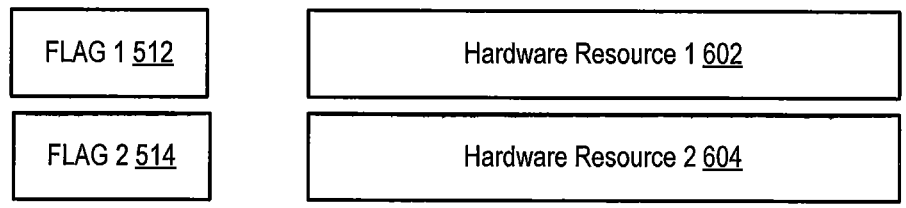
FIG. 6 is a diagram of key update flags corresponding to hardware resources in a configuration of a TEE, according to various embodiments.
Figure 7:
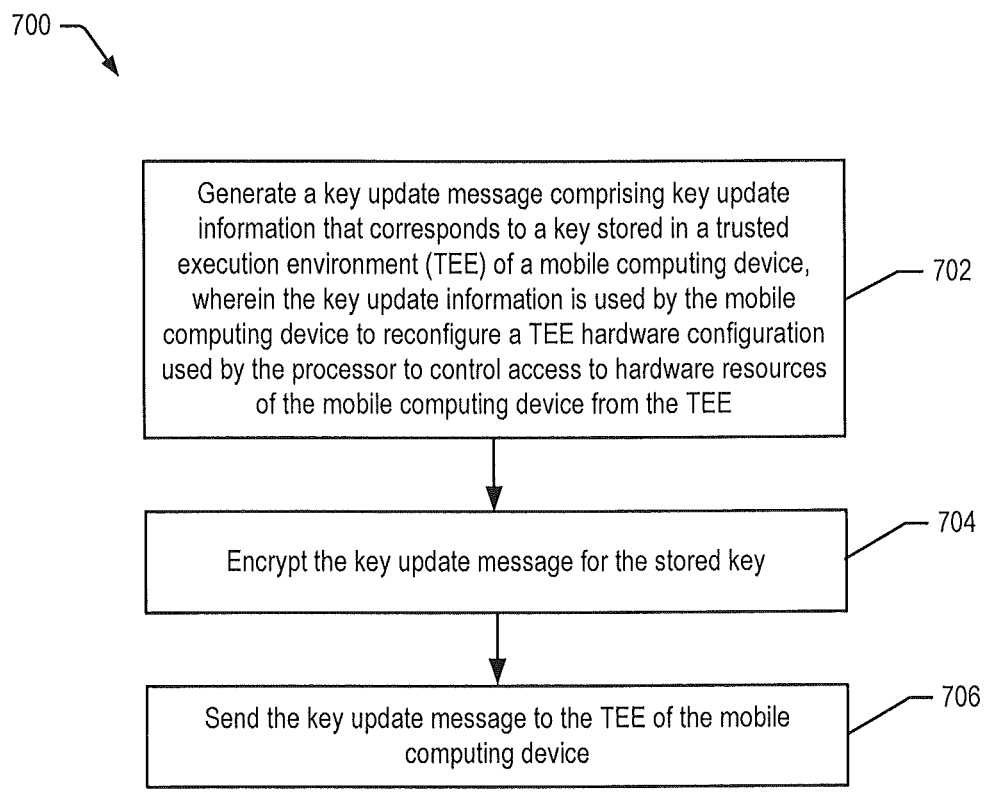
FIG. 7 is a flowchart illustrating another process for updating a TEE hardware configuration, according to various embodiments.

According to some embodiments, FIGS. 3, 5 and 6 will be described with reference to flowchart 400 in FIG. 4 and flowchart 700 in FIG. 7. FIG. 4 may represent operations from a viewpoint of a mobile computing device, such as device 200, while FIG. 7 may represent operations from a viewpoint of key update server 320. In some embodiments, key update server 320 may include a memory, processor and communication interface, such as shown by the memory 220, processor 210 and communication interface 216 of device 200 in FIG. 2. Key update server 320 may be a server or application server in the cloud or a server of a cloud based service.

At block 702, a key update message is generated. The key update message may include key update information, such as a key update flag, that corresponds to a key stored in TEE 230 of device 200. The key update information is used by device 200 to reconfigure or change a configuration used by the processor to control access to hardware resources of device 200 from or in TEE 230. The configuration may include trusted application identifiers, hardware resource identifiers and whether the hardware resource is granted or denied for the trusted application. There may be more than one key update flag that is used to toggle on or off certain hardware capabilities. A combination of flags may provide for a specific configuration or capability. Certain profiles of flags and hardware resource configurations may be stored by key update server 320. These profiles may have corresponding profiles stored in TEE 230 of device 200 to assist in the dynamic configuration of the keys in TEE 230 of device 200. Flags are used in this example but other types of information such as codes, numbers, strings or other abbreviated forms of information may be used.

The key update message is encrypted for a stored key on device 200 (block 704). This encryption may involve private keys available only in the TEE of certain mobile devices. The key update message is then sent to device 200 (block 706). Passing the key update message from the key update server 320 to device 200 may include known security measures for encryption, decryption and authentication of the key update messages by device 200. The key update message may be sent to TEE 230 of device 200. In some cases, the key update message may be addressed only to the stored key and the stored key may be one of a plurality of stored keys.

Figure 5:
FIG. 5 is a diagram of an update message, according to various embodiments.

FIG. 5 shows an example key update message, according to some embodiments. In this example, the key update message is an OTA message 510. The OTA message 510 includes key flags, flag 512 and flag 514. These key update flags correspond to hardware resources in TEE 230 of device 200. For example, FIG. 6 is a diagram of key update flags corresponding to hardware resources in a configuration of a TEE, according to various embodiments. In FIG. 6, flag 1 512 corresponds to hardware resource 602 and flag 2 corresponds to hardware resource 2 604.

The key update message is received from a computing device, such as key update server 320, at block 402 of FIG. 4. At block 404, the key update message is authenticated for the stored key in TEE 230 of a mobile computing device, such as device 200. The stored key defines a configuration for access to hardware resources of device 200 from TEE 230 or within TEE 230.

According to some embodiments, the encrypted key BLOB may be decrypted using a private key of the stored key in TEE 230. The configuration of the stored key defining how the processor can control access to the hardware resource for the trusted application in TEE 230 may then be updated based on the key update information.

Following a positive authentication of the key update message, the TEE hardware configuration is changed or reconfigured based on the key update flags (block 406). Positive authentication may include a successful match of signed public and/or private certificates or any other successful verification using common methods to securely authenticate messages. The TEE hardware configuration may include allowing or denying access to certain resources. The access to the hardware resources is changed for the stored key. This is made possible by the addition of a TEE configuration in the stored key and TEE Configuration Manager 240 which operates to change the TEE configuration of the stored key in response to instructions in a key update message or key update information that may include key update flags.

According to some embodiments, only the stored key is updated and other stored keys are not updated or changed. The key update message may be directed only to a single trusted application in TEE 230 or a subset of trusted applications in TEE 230. Access to only a single hardware resource or a subset of hardware resources may change. In some cases, a trusted application in TEE 230 may have multiple stored keys and only one of those or all of those stored keys for a trusted application in TEE 230 may have a configuration change based on the key update message.

In an example, HD content may require a secure video path in the TEE from the content source to a video display. The TEE hardware configuration for the key for such HD content may allow access to a display, such as display 260, but deny access to video output 270 or any other applications. However, due to an agreement reached between the content owner and another party, the HD video content should now be provided to another application installed on device 200 that provides a private key. Currently, the other application cannot receive the HD video content even if it has the private key because the TEE hardware configuration of the stored key in TEE 230 does not allow it. A key update message may be sent to TEE 230 to change the hardware configuration for the private key to allow the export of the HD video content to the specific application, which may be authenticated with the private key. This allows content owners to change their secure hardware capabilities for existing mobile device owners rather than only for owners of newly purchased mobile devices.

In another example, SD content may have a private key that is accessed only by a specific TEE application on device 200, and the private key cannot be exported outside TEE 230. SD content encrypted with this private key may be allowed to pass on to the normal operating system outside the secure space. Access to video output 270 is denied. However, due to a licensing change, access to video output 270 should be made available. A key update message may be sent to device 200. TEE Configuration Manager 240 of TEE 230 of device 200 receives the key update message and identifies key update flags in the key update information. Based on a key update flag of the key update message, TEE Configuration Manager 240 changes the TEE hardware configuration of the stored key corresponding to the key update message such that access to video output 270 is made available for the stored key in TEE 230.

Although reference to hardware configuration changes are made in certain examples, changes can be made to TEE software related to a stored key. In a further example, an Application Authentication Identifier may be used by an application in TEE 230 or originating from TEE 230. This may include a private key that can only be accessed by a specific TEE application. However, a key update message may be used to change the software configuration of the stored key in TEE 230 so that the private key can be exported outside TEE 230.

In some embodiments, other configuration examples may include enabling, disabling or controlling a quality of service (QoS) provided for communications with an application or hardware.

According to some embodiments, key BLOBs of a TEE may be OTA updated so that new software does not need to be pushed to mobile devices each time the use case of a stored TEE key is supposed to change. As it is the owner of premium content or DRM protected content that may wish to make secure hardware changes for the premium content, it may be more useful to provide this flexibility independent of the mobile device manufacturers and mobile device software update teams. Although the mobile device manufacturers ensure the security of all applications on the mobile device, content owners may be afforded the opportunity to change how their content is protected.

Many different embodiments have been disclosed herein and different applications/variations will be apparent to a skilled person having knowledge of the present disclosure. In the drawings and specification, there have been disclosed typical embodiments of the invention and, although specific terms are employed, they are used in a generic and descriptive sense only and not for purposes of limitation, the scope of the invention being set forth in the following claims. It would be understood that it would be unduly repetitious and obfuscating to literally describe and illustrate every combination and subcombination of these embodiments. Accordingly, the present specification, including the drawings, shall be construed to constitute a complete written description of all combination and subcombinations of the embodiments of the present invention described herein, and of the manner and process of making and using them, and shall support claims to any such combination or subcombination.

In the specification, there have been disclosed embodiments of the invention and, although specific terms are employed, they are used in a generic and descriptive sense only and not for purposes of limitation.

What is claimed is:

1. A mobile computing device, comprising:
   a processor; and
   a memory coupled to the processor and comprising computer readable program code embodied in the memory that when executed by the processor causes the processor to perform operations comprising:
   receiving a key update message comprising key update information from another computing device for a key stored in a trusted execution environment (TEE) of the mobile computing device, wherein the processor uses a configuration defined by the stored key to control whether a trusted application in the TEE is allowed access to resources of the mobile computing device;
   authenticating the key update message for the key stored in the trusted execution environment (TEE) of the mobile computing device; and
   responsive to a positive authentication of the key update message, changing the configuration defined by the stored key in the TEE based upon the key update information, wherein changes to the configuration responsive to the key update information changes which of the resources of the mobile computing device the trusted app is allowed to access by the processor.

2. The mobile computing device of claim 1, wherein the key update information identifies a resource of the mobile computing device that is authorized to be used by the trusted application in the TEE.

3. The mobile computing device of claim 2, wherein the key update information is first key update information and the resource is a first hardware resource authorized by the stored key to be used by the trusted application, and wherein the key update message comprises second key update information corresponding to a second hardware resource of the mobile electronic device authorized by the stored key to be used by the trusted application different than the first hardware resource.

4. The mobile computing device of claim 2, wherein the key update message is an over-the-air (OTA) message received by the mobile computing device from the other computing device, and wherein the operations further comprise controlling whether the trusted application is allowed access to the resource based on the changes to the configuration responsive to the key update information.

5. The mobile computing device of claim 2,
   wherein the key update message comprises an encrypted key binary large object (key BLOB),
   wherein the operations further comprise decrypting the encrypted key BLOB using a private key of the stored key in the TEE, and
   wherein changing the configuration defined by the stored key comprises updating the configuration used by the processor to control whether the trusted application in the TEE is allowed access to the resource based on the key update information.

6. The mobile computing device of claim 5, wherein the key update information comprises a key update flag, and wherein updating the configuration defined by the stored key comprises updating the configuration to grant or deny access to the resource based on the key update flag.

7. The mobile computing device of claim 5, wherein updating the configuration defined by the stored key comprises storing a key BLOB in the TEE.

8. The mobile computing device of claim 5, wherein updating the configuration comprises updating the configuration only for the stored key, and wherein the stored key is one of a plurality of stored keys in the TEE.

9. A method, comprising:
   receiving, by a mobile computing device, a key update message comprising key update information from another computing device for a key stored in a trusted execution environment (TEE) of the mobile computing device, wherein a processor of the mobile computing device uses a configuration defined by the key stored in the TEE of the mobile computing device to control whether a trusted application in the TEE is allowed access to resources of the mobile computing device;
   authenticating the key update message for the key stored in the trusted execution environment (TEE) of the mobile computing device; and responsive to a positive authentication of the key update message, changing the configuration defined by the stored key in the TEE based upon the key update information, wherein changes to the configuration responsive to the key update information changes which of the resources of the mobile computing device the trusted app is allowed to access by the processor.

10. The method of claim 9, wherein the key update information identifies a resource of the mobile computing device that is authorized to be used by the trusted application in the TEE.

11. The method of claim 10, wherein the key update information is first key update information and the resource is a first hardware resource authorized to be used by the trusted application, and wherein the key update message comprises second key update information corresponding to a second hardware resource of the mobile electronic device authorized to be used by the trusted application different than the first hardware resource.

12. The method of claim 10, wherein the key update message is an over-the-air (OTA) message received by the mobile computing device from the other computing device, and wherein the method further comprises controlling whether the trusted application is allowed access to the resource based on the changes to the configuration responsive to the key update information.

13. The method of claim 10,
wherein the key update message comprises an encrypted key binary large object (key BLOB),
wherein the method further comprises decrypting the encrypted key BLOB using a private key of the stored key in the TEE, and
wherein changing the configuration defined by the stored key comprises updating the configuration used by the processor to control whether the trusted application in the TEE is allowed access to the resource based on the key update information.

14. The method of claim 13, wherein the key update information comprises a key update flag, and wherein updating the configuration defined by the stored key comprises updating the configuration to grant or deny access to the resource based on the key update flag.

15. The method of claim 13, wherein the updating the configuration defined by the stored key comprises storing a key BLOB in the TEE.

16. The method of claim 13, wherein updating the configuration comprises updating the configuration only for the stored key, and wherein the stored key is one of a plurality of stored keys in the TEE.

17. A computing device, comprising:
a processor; and
a memory coupled to the processor and comprising computer readable program code embodied in the memory that when executed by the processor causes the processor to perform operations comprising:
generating a key update message comprising key update information that corresponds to a key stored in a trusted execution environment (TEE) of a mobile computing device, wherein the key update information is used by the mobile computing device to reconfigure a TEE configuration used by a processor of the mobile device to control whether a trusted application in the TEE is allowed access to resources of the mobile computing device;
encrypting the key update message for the stored key; and
sending the key update message to the TEE of the mobile computing device.

18. The computing device of claim 17, wherein the key update information identifies a resource of the mobile computing device that is authorized to be used by the trusted application in the TEE.

19. The computing device of claim 18, wherein the key update information comprises a key update flag to cause the processor of the mobile device to update the configuration to grant or deny access to the resource by the trusted application based on the key update flag.

20. The computing device of claim 17, wherein the key update message is an over-the-air (OTA) message comprising an encrypted key binary large object (key BLOB), and wherein the key update information of the key update message corresponds only to the stored key in the TEE from among a plurality of stored keys in the TEE.

* * * * *